US012682458B2

(12) United States Patent
Hasebe et al.

(10) Patent No.: US 12,682,458 B2
(45) Date of Patent: Jul. 14, 2026

(54) QUALITY EVALUATION METHOD FOR SPHEROID INCLUDING HEPATOCYTES

(71) Applicants: SCREEN Holdings Co., Ltd., Kyoto (JP); Cyfuse Biomedical K.K., Tokyo (JP)

(72) Inventors: Ryo Hasebe, Kyoto (JP); Toshihiko Maekawa, Tokyo (JP); Ayu Inoue, Tokyo (JP)

(73) Assignees: SCREEN Holdings Co., Ltd., Kyoto (JP); Cyfuse Biomedical K.K., Tokyo (JP)

( * ) Notice: Subject to any disclaimer, the term of this patent is extended or adjusted under 35 U.S.C. 154(b) by 264 days.

(21) Appl. No.: 18/599,728

(22) Filed: Mar. 8, 2024

(65) Prior Publication Data

US 2024/0303813 A1 Sep. 12, 2024

(30) Foreign Application Priority Data

Mar. 10, 2023 (JP) ................................ 2023-037283

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/30024* (2013.01)

(58) Field of Classification Search
CPC G06T 7/0012; G06T 7/11; G06T 2207/30024
See application file for complete search history.

(56) References Cited

U.S. PATENT DOCUMENTS

2015/0240203 A1* 8/2015 Khetani ................. C12N 5/067 435/7.1
2016/0349240 A1* 12/2016 Fujimoto ........... G01N 33/5008
2022/0315899 A1 10/2022 Maekawa et al.
2024/0303811 A1* 9/2024 Hasebe ..................... G06T 7/62
2025/0228899 A1* 7/2025 Stevens .................. C12N 5/067

FOREIGN PATENT DOCUMENTS

CN 113066080 A * 7/2021 ............ G06N 3/048
EP 3473727 A1 4/2019
JP 2015-181348 A 10/2015

OTHER PUBLICATIONS

2021.*
Extended European Search Report corresponding to European Patent Application No. 24158147.9 dated May 15, 2024.

* cited by examiner

*Primary Examiner* — Pinalben Patel
(74) *Attorney, Agent, or Firm* — Rimon P.C.

(57) ABSTRACT

In an evaluation method, first, spheroids obtained by three-dimensional culture of multiple kinds of liver-derived cells are imaged by optical coherence photography, a localization region is extracted from the photographic image, the localization region is analyzed (analysis step), and the condition of the spheroid is evaluated. The analysis step includes a first calculation step of calculating the area of the entire spheroid in the photographic image, a second calculation step of calculating the area of the localization region, a third calculation step of calculating the ratio of the localization region on the basis of the two areas, and a fourth calculation step of calculating an evaluation parameter on the basis of the ratio.

5 Claims, 13 Drawing Sheets

QUALITY EVALUATION METHOD FOR SPHEROID INCLUDING HEPATOCYTES

RELATED APPLICATIONS

This application claims the benefit of Japanese Application No. 2023-037283, filed on Mar. 10, 2023, the disclosure of which is incorporated by reference herein.

BACKGROUND OF THE INVENTION

Field of the Invention

The present invention relates to an evaluation method for spheroids.

Description of the Background Art

There is conventionally known an observation apparatus that images a biological specimen consisting of a plurality of cells by optical coherence tomography (OCT), and observes the biological sample on the basis of the obtained tomographic image. Such a conventional observation apparatus as mentioned above is described in, for example, Japanese Patent Application Publication No. 2015-181348. With the use of this type of observation apparatus, it is possible to noninvasively observe a three-dimensional structure of a biological sample.

A biological sample such as a spheroid includes an unusual part in which the status of cells is different from that in the other parts, in some cases. For example, in a case in which multiple kinds of cells are combined to form a biological sample such as a spheroid, certain kinds of cells may probably be localized on the outside or on the inside of the biological sample. Further, in a biological sample such as a spheroid that includes stem cells and the other kinds of cells, differentiated cells may probably be localized in a part of the biological sample. In quality control of the biological sample, it is very important to observe those unusual parts.

As a conventional method for observing an unusual part such as a localization region of a spheroid, a method of staining a section to be observed with the use of a fluorescent reagent is known. However, this method causes damages to an object to be observed. Hence, there is a demand for a technology for observing an unusual part of a biological sample in a natural condition as it is without causing damages to the unusual part.

SUMMARY OF THE INVENTION

The present invention has been made in view of the above-described situation, and it is an object to provide an evaluation method that makes it possible to noninvasively evaluate the condition of a spheroid.

To solve the above-described problem, the first invention of the present application is directed to an evaluation method for a spheroid. The spheroid is a spheroid including multiple kinds of liver-derived cells including a hepatocyte, and the evaluation method includes: an image acquisition step of imaging the spheroid by optical coherence tomography and acquiring a photographic image; a region extraction step of extracting a localization region in which one kind of cell is localized, from the photographic image; an analysis step of analyzing the localization region; and an evaluation step of evaluating a condition of the spheroid, wherein the analysis step includes: a first calculation step of calculating an area of the entire spheroid in the photographic image; a second calculation step of calculating an area of the localization region in the photographic image; a third calculation step of calculating a ratio of the localization region on the basis of the area of the entire spheroid and the area of the localization region; and a fourth calculation step of calculating an evaluation parameter on the basis of the ratio of the localization region.

The second invention of the present application is directed to the evaluation method of the first invention, wherein the evaluation step includes a determination step of determining a quality of the spheroid on the basis of the evaluation parameter.

The third invention of the present application is directed to the evaluation method of the first invention, wherein the evaluation parameter is an estimated value of a secretion amount of predetermined protein in the spheroid.

The fourth invention of the present application is directed to the evaluation method of the third invention, wherein the evaluation parameter is an estimated value of enzyme activity of CYP3A4 in the spheroid.

The fifth invention of the present application is directed to the evaluation method of any of the first to fourth inventions, wherein the region extraction step includes: a first extraction step of extracting an entire region corresponding to the spheroid, from the photographic image; a second extraction step of extracting a high-intensity region of which intensity value is higher than a predetermined threshold value in the entire region; and a third extraction step of extracting a region that is left after the high-intensity region and a region inner than the high-intensity region are excluded from the entire region, as the localization region.

The sixth invention of the present application is directed to an evaluation method for a spheroid. The spheroid is a spheroid including multiple kinds of liver-derived cells including a hepatocyte, and the evaluation method includes: a training step of creating a trained model configured to receive a photographic image of the spheroid imaged by optical coherence tomography, as input information, and produce a localization region in which one kind of cell is localized, as output information, by deep learning; an image acquisition step of imaging the spheroid by optical coherence tomography and acquiring a photographic image; a region extraction step of inputting the photographic image to the trained model, to extract the localization region output from the trained model; an analysis step of analyzing the localization region; and an evaluation step of evaluating a condition of the spheroid, wherein the analysis step includes: a first calculation step of calculating an area of the entire spheroid in the photographic image; a second calculation step of calculating an area of the localization region in the photographic image; a third calculation step of calculating a ratio of the localization region on the basis of the area of the entire spheroid and the area of the localization region; and a fourth calculation step of calculating an evaluation parameter on the basis of the ratio of the localization region.

Effects of the Invention

According to the first to sixth inventions of the present application, the localization region in which a specific kind of cells are localized is extracted from the photographic image of the spheroid including multiple kinds of cells, and the evaluation parameter based on the ratio of the localization region can be calculated. This enables noninvasive evaluation of the spheroid.

Especially, according to the third invention and the fourth invention of the present application, a parameter that directly shows whether or not the spheroid exhibits a required behavior as a part of tissue is used as the evaluation parameter, which makes it possible to obtain an evaluation parameter that is easier for a user to grasp.

Especially, according to the fifth invention of the present application, a localization region corresponding to an unusual portion extending over the outer surface of the biological sample can be accurately extracted.

Especially, according to the sixth invention of the present application, a localization region can be accurately extracted from the photographic image of the spheroid by using the trained model.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a preferred embodiment of the present invention will be described with reference to the drawings.

1. CONFIGURATION OF OBSERVATION APPARATUS

Figure 1:
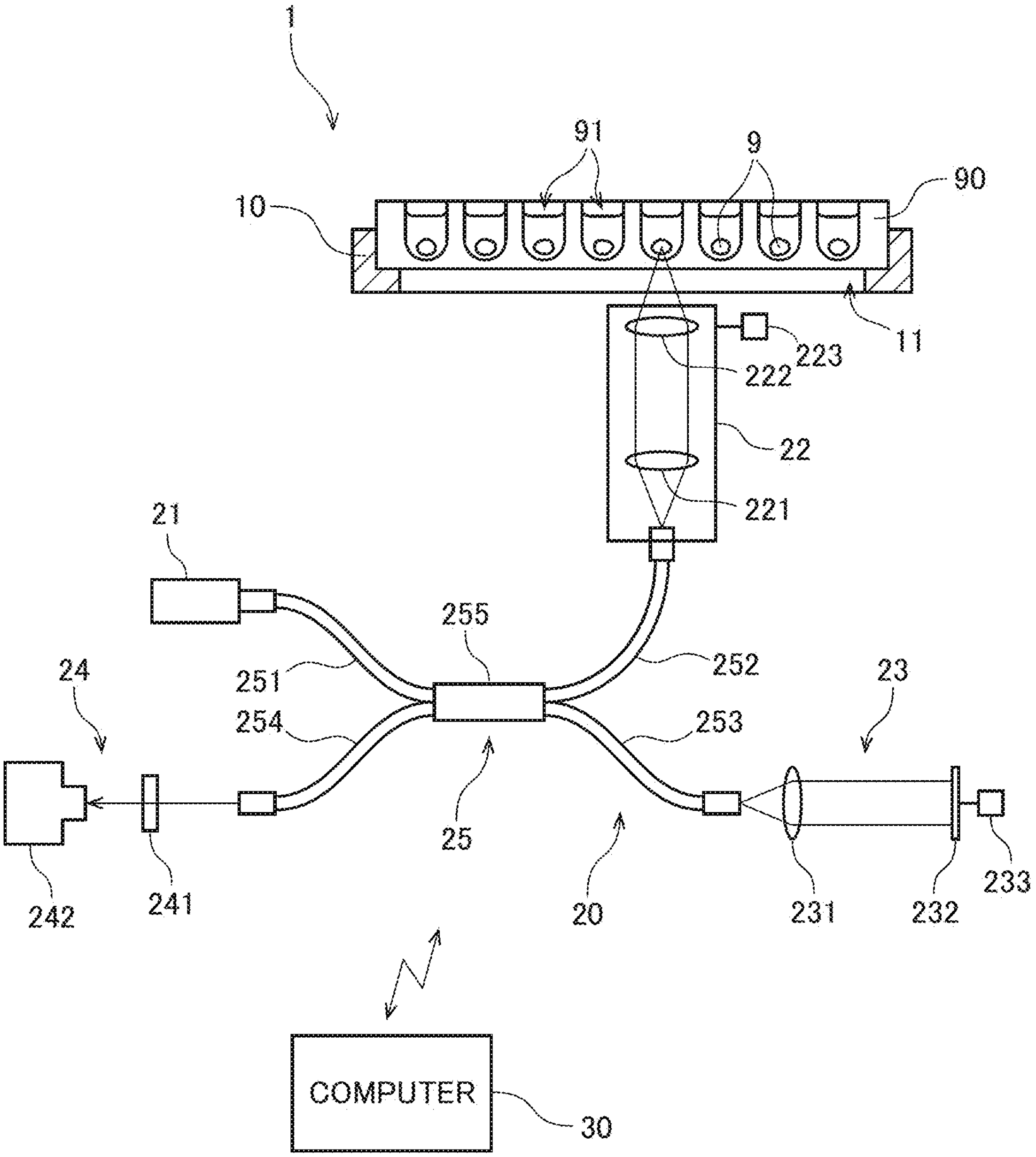
FIG. 1 is a diagram showing a configuration of an observation apparatus.

FIG. 1 is a diagram showing a configuration of an observation apparatus 1 according to one preferred embodiment of the present invention. The observation apparatus 1 is an apparatus that images a biological sample 9 held in a sample holder 90 and evaluates the condition of the biological sample 9 on the basis of the acquired image.

The biological sample 9 to be observed and evaluated by the observation apparatus 1 is a cell aggregate called a spheroid.

A spheroid can be put to known various uses. For example, by placing a plurality of spheroids in a bio 3D printer, it is possible to form a three-dimensional structure of a larger size. In placing spheroids in a bio 3D printer, it is preferable to three-dimensionally place the spheroids. For example, in a case in which a three-dimensional structure is formed by using spheroids in which two or more kinds of cells composing a liver are uniformly included, the formed three-dimensional structure can be put to uses in the field of regenerative medicine, evaluation of hepatotoxicity of a substance under test, and the like. Preferably, the observation apparatus 1 evaluates whether the condition of a spheroid including multiple kinds of cells is good or bad, in order to select a spheroid suitable as a material in a bio 3D printer.

As shown in FIG. 1, the observation apparatus 1 includes a stage 10, an imaging unit 20, and a computer 30.

The stage 10 is a support plate that supports the sample holder 90. For the sample holder 90, for example, a well plate is used. The well plate consists of multiple wells 91. The well 91 is a recessed portion that is recessed downward. Each of the wells 91 has a U-shaped or V-shaped bottom. The biological sample 9, together with a culture medium, is held near the bottom of each well 91. For a material of the sample holder 90, transparent resin or glass that transmits light is used.

The stage 10 includes an opening 11 that vertically penetrates. The sample holder 90 is horizontally supported while being fit in the opening 11 of the stage 10. Thus, the lower surface of the sample holder 90 is exposed toward the imaging unit 20 without being covered by the stage 10.

The imaging unit 20 is a unit that images the biological sample 9 in the sample holder 90. The imaging unit 20 is placed below the sample holder 90 supported by the stage 10. The imaging unit 20 of the present preferred embodiment is an optical coherence tomography (OCT) device capable of imaging the biological sample 9 to produce a tomographic image and a three-dimensional image thereof.

As shown in FIG. 1, the imaging unit 20 includes a light source 21, an object optical system 22, a reference optical system 23, a detection unit 24, and an optical fiber coupler 25. The optical fiber coupler 25 includes first to fourth optical fibers 251 to 254 connected at a connecting unit 255. The light source 21, the object optical system 22, the reference optical system 23, and the detection unit 24 are connected to each other via optical paths formed by the optical fiber coupler 25.

The light source 21 includes a light emitting element such as an LED. The light source 21 emits low-coherence light including a wide range of wavelength components. In order to allow light to reach the inside of the biological sample 9 without invasively treating the biological sample 9, it is desirable that light emitted from the light source 21 is a near-infrared ray. The light source 21 is connected to the first optical fiber 251. Light emitted from the light source 21 is incident on the first optical fiber 251 and is separated into light incident on the second optical fiber 252 and light incident on the third optical fiber 253 at the connecting unit 255.

The second optical fiber 252 is connected to the object optical system 22. Light traveling from the connecting unit 255 to the second optical fiber 252 is incident on the object optical system 22. The object optical system 22 includes a plurality of optical components including a collimator lens 221 and an object lens 222. Light emitted from the second optical fiber 252 passes through the collimator lens 221 and the object lens 222, and is applied to the biological sample 9 in the sample holder 90. At that time, the object lens 222 causes the light to converge to the biological sample 9. Then, light reflected from the biological sample 9 passes through the object lens 222 and the collimator lens 221 and is again incident on the second optical fiber 252. Hereinafter, the light reflected from the biological sample 9 will be referred to as "observation light".

As shown in FIG. 1, the object optical system 22 is connected to a scan mechanism 223. The scan mechanism 223 slightly moves the object optical system 22 vertically and horizontally in accordance with an instruction from the computer 30. Thus, the incidence position of light on the biological sample 9 can be slightly moved vertically and horizontally.

Further, the imaging unit 20 can be moved horizontally by a movement mechanism not shown. Thus, the field of view of the imaging unit 20 can be changed among the plurality of wells 91.

The third optical fiber 253 is connected to the reference optical system 23. Light travelling from the connecting unit 255 to the third optical fiber 253 is incident on the reference optical system 23. The reference optical system 23 includes a collimator lens 231 and a mirror 232. Light emitted from the third optical fiber 253 passes through the collimator lens 231 and is incident on the mirror 232. Then, light reflected from the mirror 232 passes through the collimator lens 231 and is again incident on the third optical fiber 253. Hereinafter, the light reflected from the mirror 232 will be referred to as "reference light".

As shown in FIG. 1, the mirror 232 is connected to a retraction mechanism 233. The retraction mechanism 233 slightly moves the mirror 232 in an optical-axis direction in accordance with an instruction from the computer 30. Thus, the optical-path length of the reference light can be changed.

The fourth optical fiber 254 is connected to the detection unit 24. The observation light that is incident on the second optical fiber 252 from the object optical system 22 and the reference light that is incident on the third optical fiber 253 from the reference optical system 23 join together at the connecting unit 255, and are incident on the fourth optical fiber 254. Then, light emitted from the fourth optical fiber 254 is incident on the detection unit 24. At that time, interference is caused between the observation light and the reference light due to a phase difference therebetween. The optical spectrum of interference light at that time varies with the height of reflection position of the observation light.

The detection unit 24 includes a spectroscope 241 and a light detector 242. The interference light emitted from the fourth optical fiber 254 is dispersed into each wavelength component in the spectroscope 241, and is incident on the light detector 242. The light detector 242 detects each dispersed interference light, and outputs its corresponding detection signal to the computer 30.

An image acquisition unit 41 described later in the computer 30 performs Fourier transform on the detection signal provided from the light detector 242, to thereby calculate a vertical light-intensity distribution of the observation light. Further, while the object optical system 22 is horizontally moved by the scan mechanism 223, the image acquisition unit 41 repeats the above-described calculation of light-intensity distribution to thereby calculate a light-intensity distribution of the observation light at each coordinate position in a three-dimensional space. Consequently, the computer 30 can acquire a tomographic image and a three-dimensional image of the biological sample 9.

A tomographic image is formed of a plurality of pixels arranged on two-dimensional coordinates, and is data in which each pixel has a predetermined intensity value. A three-dimensional image is formed of a plurality of voxels arranged on three-dimensional coordinates and is data in which each voxel has a predetermined intensity value. That is, each of a tomographic image and a three-dimensional image is a photographic image in which intensity values are distributed on predetermined coordinates.

The computer 30 functions as a control unit that controls the operation of the imaging unit 20. Further, the computer 30 functions as a data processing unit that produces a tomographic image and a three-dimensional image on the basis of a detection signal received from the imaging unit 20 and evaluates the condition of the biological sample 9 on the basis of the acquired tomographic image and three-dimensional image.

Figure 2:
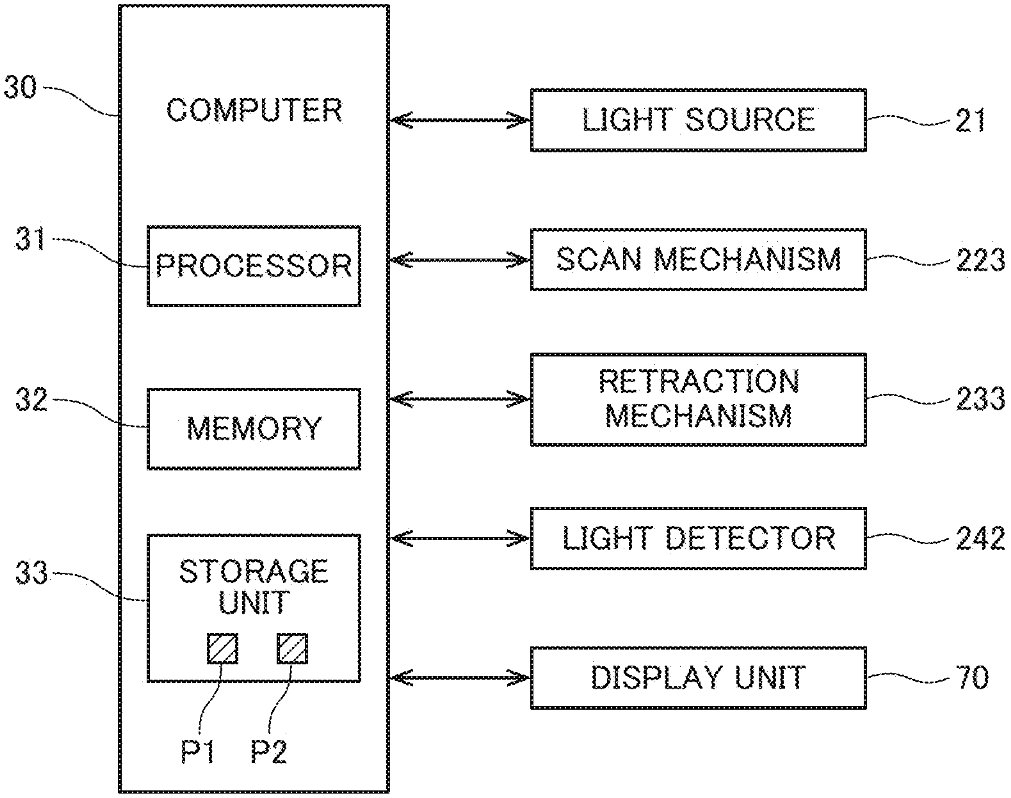
FIG. 2 is a control block diagram of the observation apparatus.

FIG. 2 is a control block diagram of the observation apparatus 1. As conceptually shown in FIG. 2, the computer 30 includes a processor 31 such as a CPU, a memory 32 such as a RAM, and a storage unit 33 such as a hard disk drive. In the storage unit 33, a control program P1 for controlling the operations of respective components in the observation apparatus 1 and a data processing program P2 for producing a tomographic image and a three-dimensional image and evaluating the condition of the biological sample 9, are stored.

Figure 3:
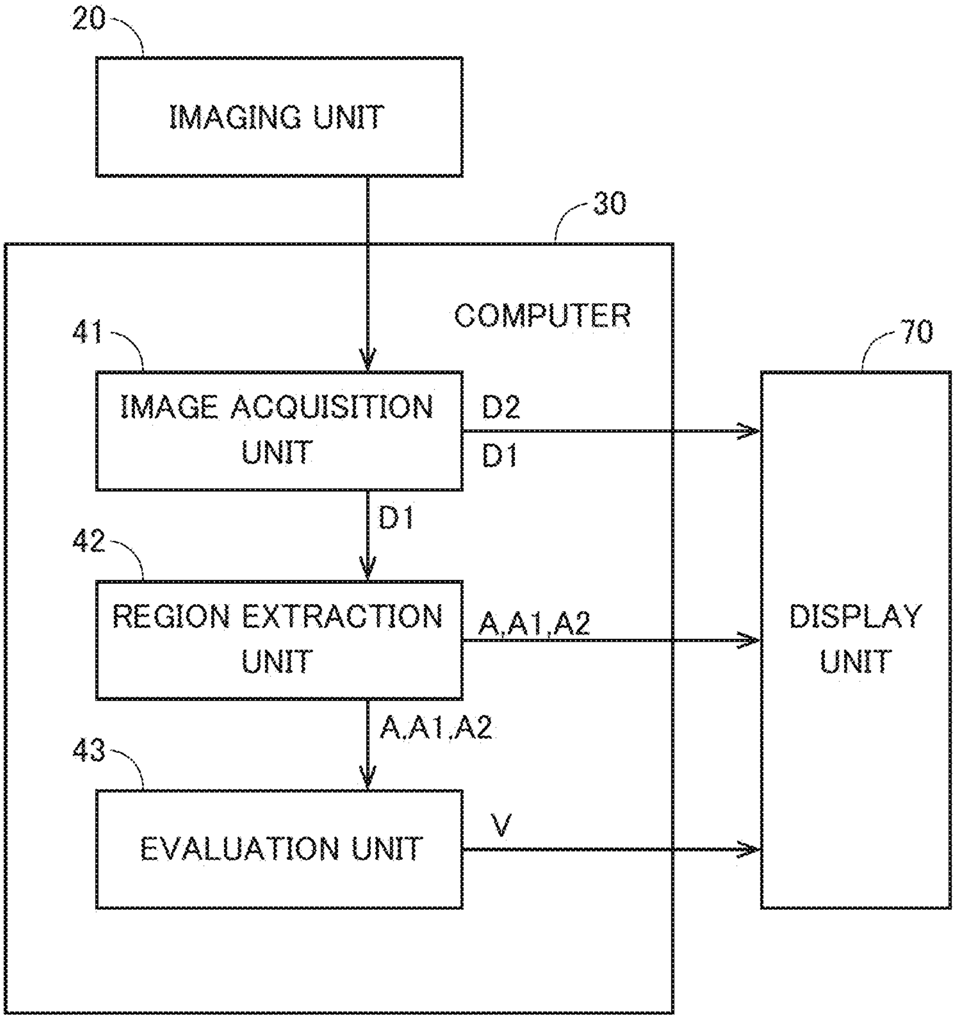
FIG. 3 is a block diagram conceptually showing functions of an image processing/evaluation apparatus.

Further, as shown in FIG. 3, the computer 30 is connected to the light source 21, the scan mechanism 223, the retraction mechanism 233, and the light detector 242 that have been described above, and to a display unit 70 described later such that the computer 30 can conduct communication with each of those components. The computer 30 controls the operations of the above-described respective components in accordance with the control program P1. Thus, an imaging process of the biological sample 9 held in the sample holder 90 proceeds.

FIG. 3 is a block diagram conceptually showing the functions of the computer 30 serving as an image processing/evaluation apparatus for observing and evaluating the biological sample 9. As shown in FIG. 3, the computer 30 includes the image acquisition unit 41, a region extraction unit 42, and an evaluation unit 43. The respective functions of the image acquisition unit 41, the region extraction unit 42, and the evaluation unit 43 are performed by an operation of the processor 31 of the computer 30 in accordance with the data processing program P2 described above. Details of processes performed by the image acquisition unit 41, the region extraction unit 42, and the evaluation unit 43 will be given later.

2. FORMATION STEP, IMAGE ACQUISITION STEP, REGION EXTRACTION STEP, ANALYSIS AND EVALUATION STEP, AND TISSUE FORMATION STEP

Next, a formation step of the spheroid 9 (biological sample 9) in the above-described observation apparatus 1, an image acquisition step, a region extraction step, an analysis and evaluation step, and a tissue formation step are described.

For the spheroid 9, a spheroid including various kinds of cells including a main tissue, a nervous tissue, and the like can be used. Preferably, the spheroid 9 is a material used in a bio 3D printer.

In any spheroid including multiple kinds of cells, irrespective of which tissue is an origin of the cells included in the spheroid, the cells are not uniformly distributed, so that a specific kind of cells are localized in a part in some cases, which may probably affect gene expression or protein secretion of the spheroid. Hence, it is required to evaluate whether or not multiple kinds of cells are uniformly distributed in the spheroid 9, preferably, whether or not multiple kinds of cells are distributed uniformly enough to be applied to formation of a structure for regenerative medicine using a bio 3D printer, or for in vitro evaluation, or the like.

The spheroid 9 can be obtained through co-culture of two or more kinds of cells by a known method in accordance with a requirement such as a purpose of use, a kind of cell, or a ratio.

Figure 4A:
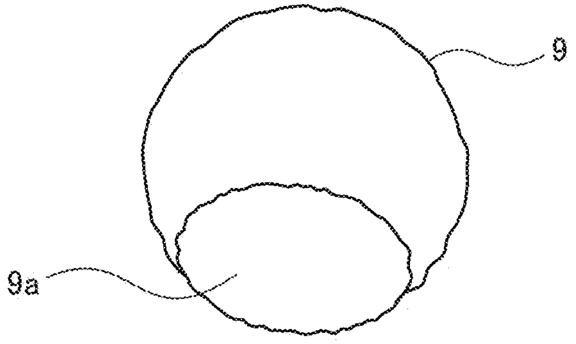
FIG. 4A is a view schematically showing an example of a spheroid.
Figure 4B:
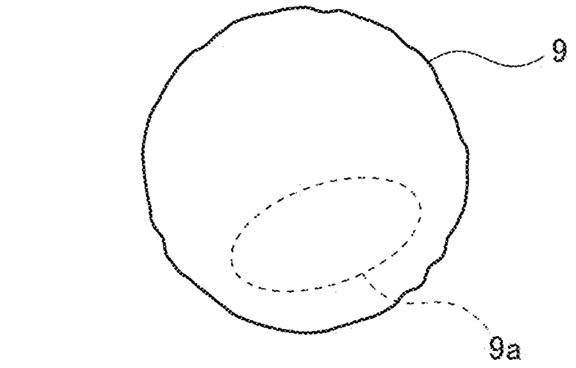
FIG. 4B is a view schematically showing another example of a spheroid.

The spheroid 9 is preferably a so-called liver spheroid. A liver spheroid is a cell aggregate including two or more kinds of cells including a liver parenchymal cell (hepatocyte) among multiple kinds of cells composing a liver. A liver spheroid can include any cell derived from a liver, in addition to a liver parenchymal cell (hepatocyte), and may include, for example, a hepatic sinusoidal endothelial cell, a Kupffer cell, a hepatic stellate cell, a pit cell, a bile duct epithelial cell, a mesothelial cell, and the like FIGS. 4A and 4B are views schematically showing examples of the spheroid 9 that is an object to be observed in the following description. The spheroid 9 shown in each of FIGS. 4A and 4B includes a localization region 9*a*. The localization region 9*a* is a portion in which a specific kind of cells among multiple kinds of cells composing the spheroid 9 are localized.

For example, the localization region 9*a* is expected to be localized in the surface of (on the outside of) the spheroid 9 as shown in FIG. 4A, or is expected to be localized in the inside of the spheroid 9 as shown in FIG. 4B.

Figure 5:
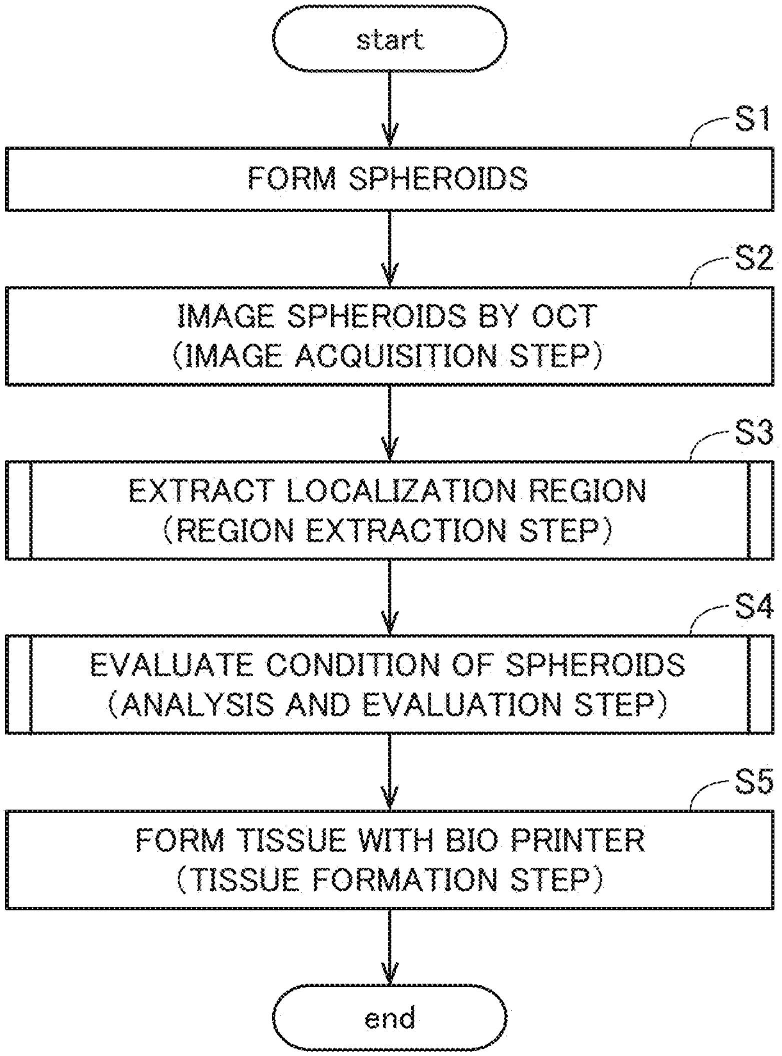
FIG. 5 is a flowchart showing a flow from a formation step to a tissue formation step.

FIG. 5 is a flowchart showing a flow from the formation step to the tissue formation step. In performing the analysis and evaluation step for the spheroid 9 with the use of the observation apparatus 1 and performing the tissue formation step with the use of a bio 3D printer, first, many spheroids 9 are formed (step S1, spheroid formation step). Then, the formed spheroids 9 are put in the sample holder 90. Note that the spheroids 9 may be formed within the sample holder 90, or the spheroids 9 having been formed in a separate culture vessel may be put in the sample holder 90. At that time, in the sample holder 90, a plurality of spheroids 9, together with a culture medium, are held.

Subsequently, the sample holder 90 is set on the stage 10 of the observation apparatus 1, and the spheroids 9 are imaged with the use of imaging unit 20 (step S2, image acquisition step). In the present preferred embodiment, the imaging unit 20 images by optical coherence tomography. Specifically, the light source 21 is caused to emit light. Then, while the object optical system 22 is slightly moved by the scan mechanism 223, each wavelength component of interference light of observation light and reference light is detected by the light detector 242. The image acquisition unit 41 of the computer 30 calculates a light-intensity distribution in each coordinate position of the spheroid 9 on the basis of each detection signal output from the light detector 242. Consequently, a tomographic image D1 and a three-dimensional image D2 of the spheroid 9 are acquired.

The observation apparatus 1 acquires a plurality of tomographic images D1 and one three-dimensional image D2 for one spheroid 9. Further, the observation apparatus 1 repeats the process of the step S2 while changing the well 91 to be imaged, to thereby acquire the tomographic images D1 and the three-dimensional images D2 of the plurality of spheroids 9. The acquired tomographic images D1 and three-dimensional images D2 are stored in the storage unit 33 of the computer 30. Moreover, the computer 30 displays the acquired tomographic images D1 and three-dimensional images D2 on the display unit 70.

Figure 6:
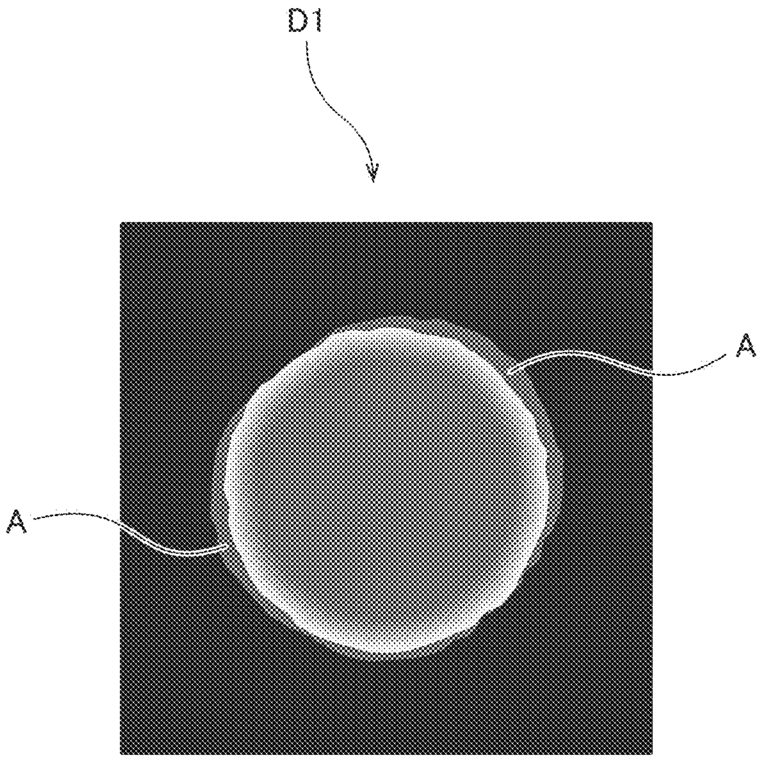
FIG. 6 is a view schematically showing a tomographic image.

FIG. 6 is a view schematically showing the tomographic image D1. In the example of FIG. 6, there is a region corresponding to the localization region 9*a* in the outer edge of the spheroid 9 having a substantially spherical shape. Hereinafter, the region corresponding to the localization region 9*a* will be referred to as a "localization region A". The region extraction unit 42 of the computer 30 extracts the localization region A from the tomographic image D1 (step S3, region extraction step).

Figure 7:
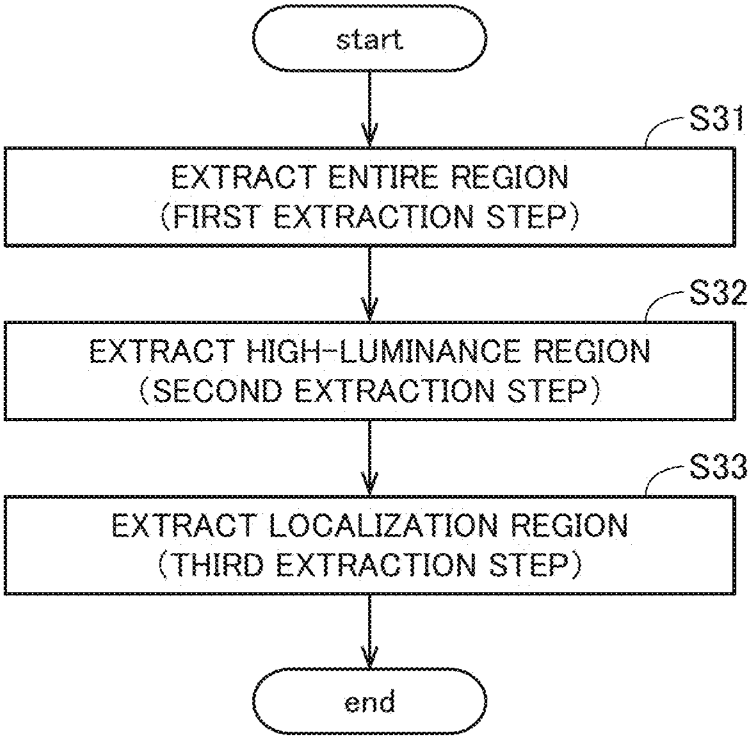
FIG. 7 is a flowchart showing an example of a flow of a region extraction step of extracting a localization region.
Figure 8:
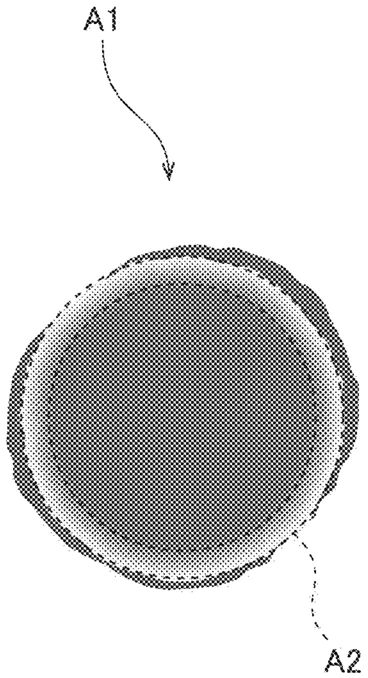
FIG. 8 is a view schematically showing a result of extraction of an entire region.

FIG. 7 is a flowchart showing an example of a flow of the region extraction step of extracting the localization region 9*a* (localization region A) of the spheroid 9 in the step S3. In the example of FIG. 7, first, the region extraction unit 42 extracts an entire region A1 corresponding to the entire spheroid 9 from the tomographic image D1 (step S31, first extraction step). Specifically, the region extraction unit 42 extracts a region having a intensity value higher than a first threshold value set in advance in the tomographic image D1, as the entire region A1. FIG. 8 is a view schematically showing a result of extraction of the entire region A1.

Secondly, the region extraction unit 42 extracts a region having an intensity value higher than a predetermined second threshold value from the entire region A1, as a high-intensity region A2 (step S32, second extraction step). Note that the second threshold value is higher than the first threshold value. In FIG. 8, the high-intensity region A2 having a ring shape is indicated by a broken line. The outer edge of a cell aggregate having a substantially spherical shape has a strong tendency to have a high intensity. For this reason, in the step S32, the high-intensity region A2 is extracted, so that the outer edge of the cell aggregate having a substantially spherical shape is defined.

Figure 9:
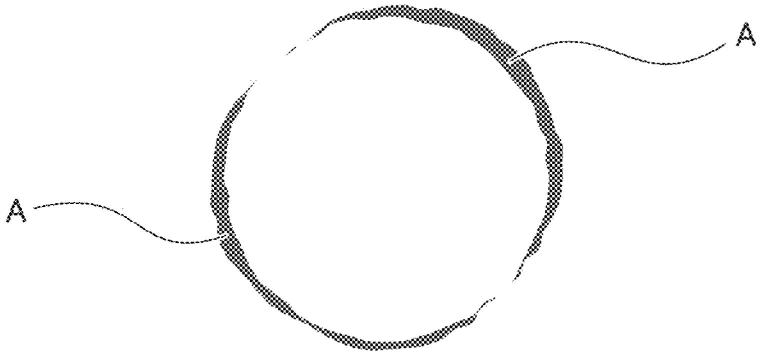
FIG. 9 is a view schematically showing a result of extraction of a localization region.

Subsequently, the region extraction unit 42 extracts a region that is left after the high-intensity region A2 and a region inner than the high-intensity region A2 are excluded from the entire region A1, as the localization region A (step S33, third extraction step). FIG. 9 is a view schematically showing a result of extraction of the localization region A. Thus, the localization region A corresponding to the localization region 9*a* extending over the outer surface of the cell aggregate having a spherical shape can be appropriately extracted.

In this manner, in the step S3, a region of which intensity value satisfies a predetermined requirement in the tomographic image D1 is extracted as the localization region A. The procedure for extracting the localization region A is not necessarily required to be the same as the above-described steps S31 to S33. The region extraction unit 42 is only required to extract the localization region A by following an appropriate procedure depending on the position or the intensity value of the localization region A.

After that, the evaluation unit 43 of the computer 30 analyzes the localization region A extracted in the step S3, to evaluate the condition of the spheroid 9 (step S4, analysis and evaluation step). In the step S4, the evaluation unit 43 analyzes the localization region 9*a* in each of the tomographic image D1 and the three-dimensional image D2, to evaluate the condition of the spheroid 9.

Figure 10:
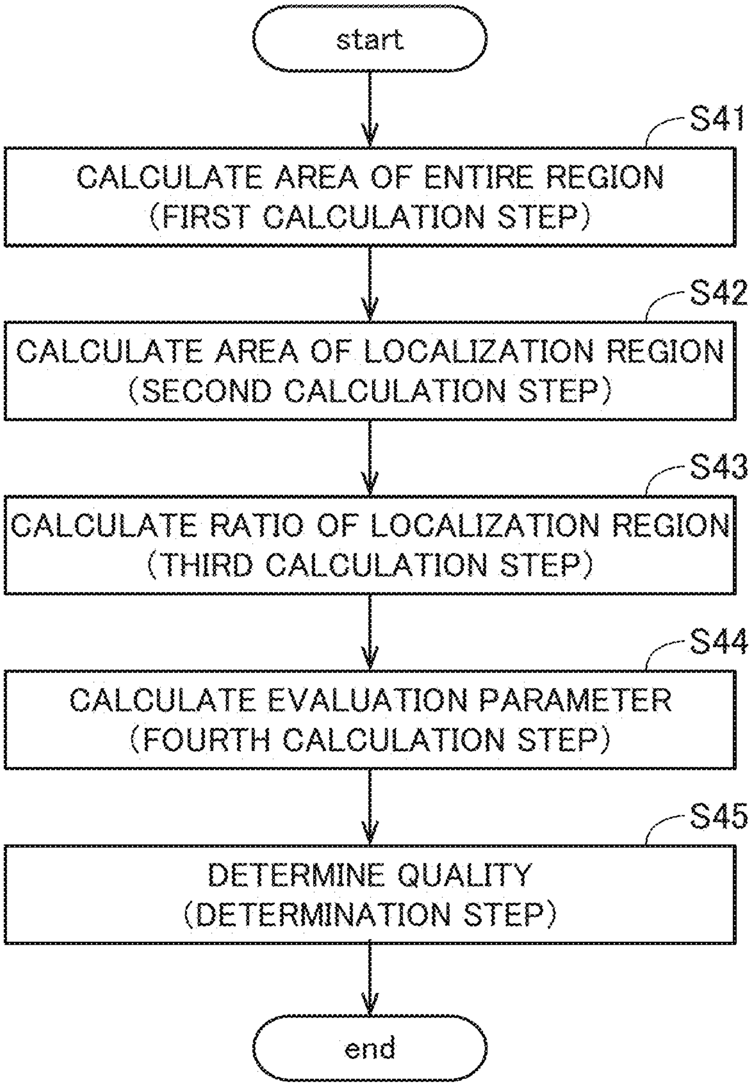
FIG. 10 is a flowchart showing an example of a flow of an analysis and evaluation step for a spheroid.

FIG. 10 is a flowchart showing an example of a flow of the analysis and evaluation step of evaluating the condition of the spheroid 9 in the step S4. In the analysis and evaluation step in the example of FIG. 10, the condition of the spheroid 9 is evaluated on the basis of the area of the localization region A in the tomographic image D1 that is a photographic image. Further, the analysis and evaluation step in the example of FIG. 10 includes an analysis step including steps S41 to S44 and an evaluation step including a step S45.

In the example of FIG. 10, first, the evaluation unit 43 calculates the area of the entire spheroid 9 in the tomographic image D1 (step S41, first calculation step). Specifically, the evaluation unit 43 calculates the area of the entire region A1 in the tomographic image D1. The area of the entire region A1 can be calculated on the basis of the number of pixels included in the entire region A1, for example.

Secondly, the evaluation unit 43 calculates the area of the localization region A in the tomographic image D1 (step S42, second calculation step). Specifically, the evaluation unit 43 calculates the area of the localization region A in the tomographic image D1. The area of the localization region A can be calculated on the basis of, for example, the number of pixels included in the localization region A.

Subsequently, the evaluation unit 43 calculates the ratio of the localization region 9*a* on the basis of the area of the entire spheroid 9 calculated in the first calculation step of the step S41 and the area of the localization region A calculated in the second calculation step of the step S42 (step S43, third calculation step). The ratio calculated in the step S43 may be, for example, an area ratio in one representative tomographic image D1, that is, a result of division of the area of the localization region A by the area of the entire region A1.

Meanwhile, for example, in a case in which a plurality of tomographic images D1 are acquired for one spheroid 9, the ratio of the localization region 9*a* calculated in the third calculation step of the step S43 may be a volume ratio. In this case, the respective volumes of the entire spheroid 9 and the localization region 9*a* are calculated on the basis of the respective areas of the entire region A1 and the localization region A in each of the plurality of tomographic images D1, first. Then, a ratio of the localization region 9*a* is calculated by division of the volume of the localization region 9*a* by the volume of the entire spheroid 9.

After that, the evaluation unit 43 calculates the evaluation parameter V (step S44, fourth calculation step). The evaluation parameter V is calculated on the basis of the ratio of the localization region 9*a* calculated in the third calculation step of the step S43. The evaluation parameter V is, for example, an estimated value of a degree of predetermined gene expression or an estimated value of a secretion amount of predetermined protein in the spheroid 9 as shown in Experiment 2 described later. The estimated value in either case is calculated on the basis of the ratio of the localization region 9*a*. In a case in which the spheroid 9 is a liver spheroid, an amount of protein CYP3A4 secreted from the spheroid 9 is used as the evaluation parameter V, for example.

As the evaluation parameter V, the ratio of the localization region 9*a* calculated in the third calculation step of the step S43 may be directly used. However, by using, as the evaluation parameter V, a parameter that directly shows whether or not the spheroid exhibits a required behavior as a part of tissue, such as an estimated value of a degree of predetermined gene expression or an estimated value of a secretion amount of predetermined protein, it is possible to obtain the evaluation parameter V that is easier for a user to grasp.

The evaluation unit 43 determines the quality of the spheroid 9 on the basis of the calculated evaluation parameter V (step S45, determination step). For example, when the evaluation parameter V is equal to or larger than a predetermined threshold value, or is equal to or smaller than a predetermined threshold value, it is determined that the spheroid 9 is suitable as a material in a bio 3D printer. Otherwise, it is determined that the spheroid 9 is not suitable as a material in a bio 3D printer.

For example, in a case in which the evaluation parameter V is exactly equal to a ratio of a localization region and the purpose is to select a healthy spheroid suitable for regenerative medicine or hepatotoxicity evaluation, it is preferable to determine a spheroid of which evaluation parameter V is equal to or smaller than the predetermined threshold value as "excellent", and determine a spheroid of which evaluation parameter V is larger than the predetermined threshold value as "unacceptable".

In a case in which an estimated value of a degree of predetermined gene expression or an estimated value of a secretion amount of predetermined protein in a spheroid, calculated on the basis of a ratio of the localization region 9*a*, is used as the evaluation parameter V, it is preferable to determine a spheroid of which evaluation parameter V is equal to or larger than a predetermined lower-limit threshold value and is equal to or smaller than a predetermined upper-limit threshold value, as "excellent", depending on the kind of a gene or protein, the composition of the spheroid, the purpose of use of the spheroid, or the like.

The size (area or volume) of the localization region 9*a*, the ratio of the localization region 9*a*, and the evaluation parameter V that are calculated by the evaluation unit 43 are stored in the storage unit 33. Further, the evaluation unit 43 displays the evaluation parameter V on the display unit 70.

As described above, in the observation apparatus 1, the spheroid 9 is imaged by optical coherence tomography, and the localization region A corresponding to the localization region 9*a* in the spheroid 9 can be extracted from the acquired tomographic image D1. This enables noninvasive observation of the localization region 9*a* of the spheroid 9. Further, the evaluation parameter V based on the ratio of the localization region 9*a* is calculated, which makes it possible to easily evaluate whether the spheroid 9 is suitable or non-suitable as a material in a bio 3D printer.

The image acquisition step of the step S2, the region extraction step of the step S3, and the analysis and evaluation step of the step S4 described above are performed on many spheroids 9 having been formed. Then, the spheroid 9 that has been determined as a suitable material in a bio 3D printer in the analysis and evaluation step of the step S4 is used to form tissues with the use of, for example, a bio 3D printer (step S5, tissue formation step). In this manner, high-quality tissues suitable for use in, for example, evaluation of hepatotoxicity, can be obtained.

3. EXPERIMENTS

3-1. Experiment 1

In order to confirm the accuracy of detecting a localization region in a tomographic image (hereinafter referred to as an "OCT image") acquired by optical coherence tomography in the evaluation method of the above-described preferred embodiment, an area ratio of a localization region in a liver spheroid was calculated by the following two methods.

(First Method: Calculating Area Ratio of Localization Region from OCT Image)

A plurality of liver spheroids were imaged using optical coherence tomography by the method described in the above-described embodiment, and OCT images (tomographic images) were acquired. A localization region was extracted from a randomly-selected image out of the acquired OCT images, and a value obtained by division of the localization region by an entire region was calculated as an area ratio.

(Second Method: Calculating Area Ratio of Localization Region from Stained Tissue-Section Image)

The plurality of liver spheroids having been imaged using optical coherence tomography by the first method were stained using a fluorescent reagent, and were each cut along a randomly-selected section. In the cut surface, a localization region was extracted by the conventional method, and a value obtained by division of the localization region by an entire region was calculated as an area ratio.

Figure 11:
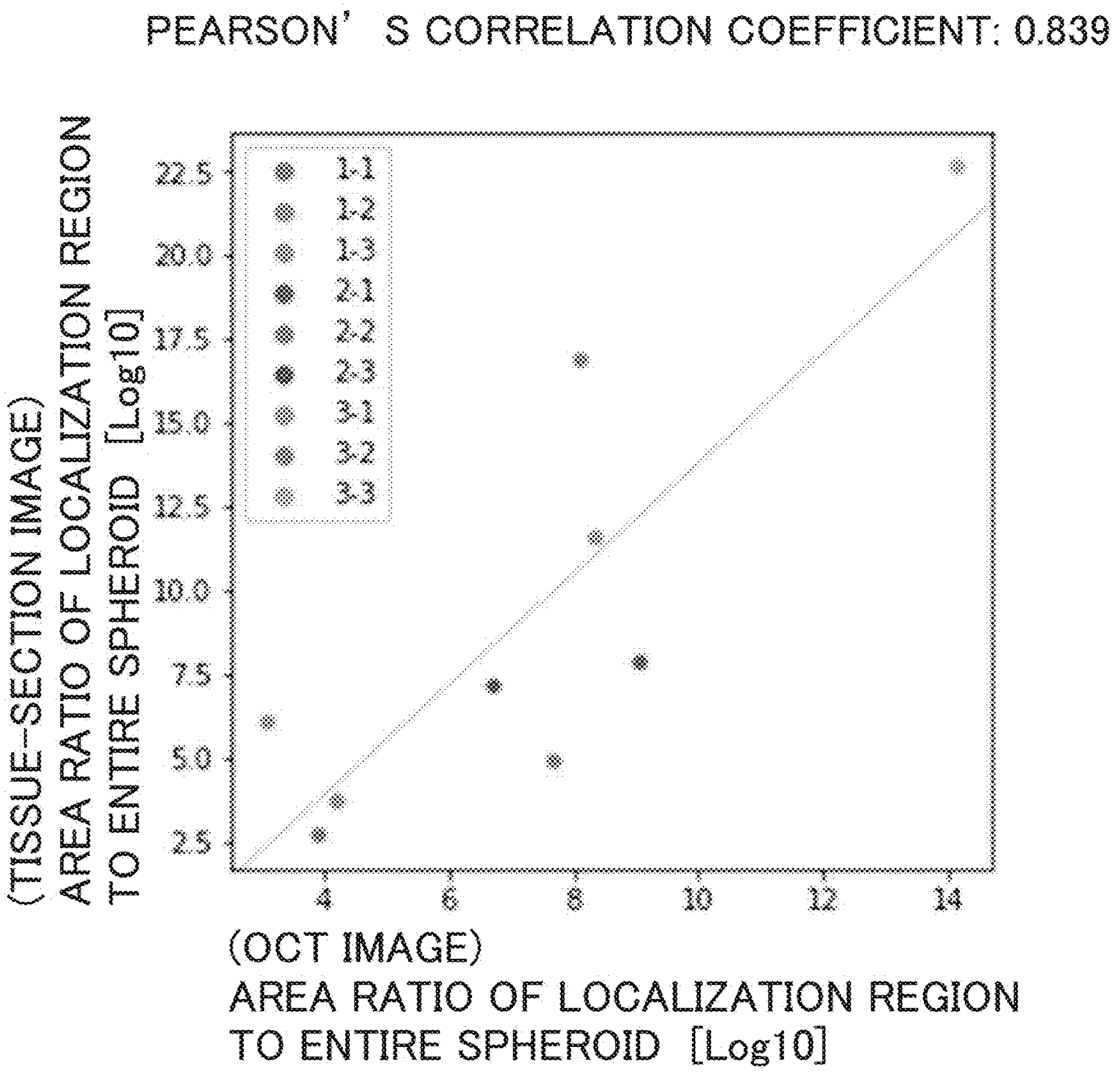
FIG. 11 is a graph showing a result of Experiment 1.

FIG. 11 shows a result of Experiment 1, and is a graph showing a relationship between the area ratio of the localization region calculated from the image (OCT image) acquired by optical coherence tomography and the area ratio of the localization region calculated from the stained tissue-section image, for the liver spheroids.

As shown in FIG. 11, Pearson's product-moment correlation coefficient between the area ratio of the localization region calculated from the OCT image acquired by optical coherence tomography and the area ratio calculated from the stained tissue-section image according to the conventional method was 0.839. That is, the area ratio of the localization region calculated from the OCT image acquired by optical coherence tomography has an adequate correlation with the area ratio calculated from the stained tissue-section image according to the conventional method. Therefore, it can be considered that the method of calculating an area ratio of a localization region from an OCT image acquired by optical coherence tomography can calculate an area ratio with accuracy similar to that of the conventional method.

3-2. Experiment 2

In order to confirm the reliability of an estimated value for the evaluation parameter V in a case in which an estimated value of a degree of predetermined gene expression or an estimated value of a secretion amount of predetermined protein is used as the evaluation parameter V in the evaluation method of the above-described preferred embodiment, an experiment was conducted by the following method.

First, a plurality of liver spheroids were imaged using optical coherence tomography by the method described in the above-described preferred embodiment, and OCT images (tomographic images) were acquired. A localization region was extracted from a randomly-selected image out of the acquired OCT images, and a value obtained by division of the localization region by an entire region was calculated as an area ratio.

Meanwhile, the enzyme activity of protein CYP3A4 secreted from each of the plurality of liver spheroids having been imaged by optical coherence tomography was measured. Note that, for each of the liver spheroids, either imaging by optical coherence tomography or measurement of the enzyme activity of protein CYP3A4 may be performed earlier.

Figure 12:
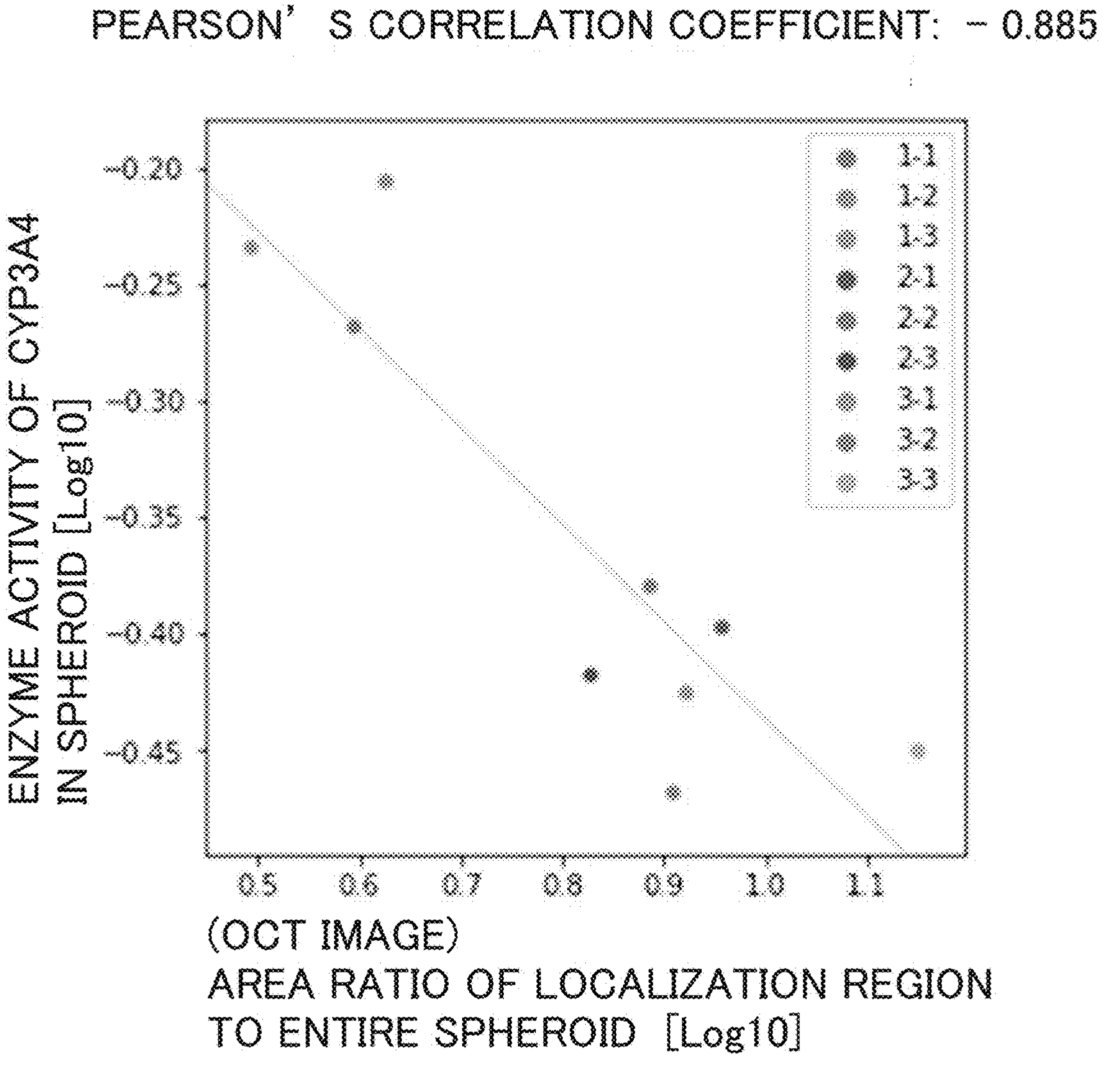
FIG. 12 is a graph showing a result of Experiment 2.

FIG. 12 shows a result of Experiment 2, and is a graph showing a relationship between the area ratio of the localization region calculated from the OCT image and the enzyme activity of CYP3A4, for the liver spheroids. As shown in FIG. 12, Pearson's product-moment correlation coefficient between the area ratio of the localization region in each liver spheroid, calculated from the OCT image, and the enzyme activity of CYP3A4, was −0.885. Between the area ratio of the localization region in each liver spheroid, calculated from the OCT image, and the enzyme activity of CYP3A4, a high (negative) correlation can be found. Therefore, it can be said that, when the enzyme activity of CYP3A4 is estimated on the basis of an area ratio of a localization region calculated from an OCT image for a liver spheroid, the resultant estimated value has sufficient reliability.

4. MODIFICATIONS

Hereinabove, one preferred embodiment of the present invention has been described, but the present invention is not limited to the above-described preferred embodiment.

4-1. First Modification

Figure 13:
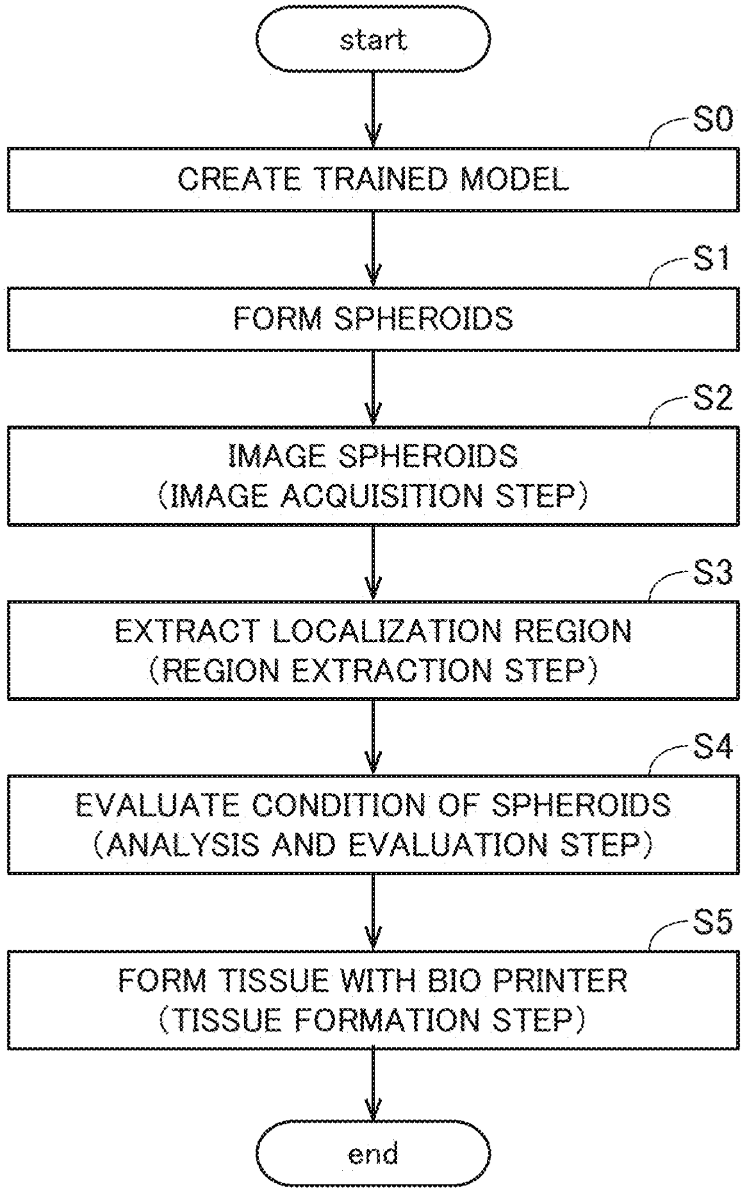
FIG. 13 is a flowchart showing a flow from a formation step to a tissue formation step in a case in which a trained model is used.

According to the above-described preferred embodiment, in the step S3, the region extraction unit 42 extracts a region of which intensity value satisfies a predetermined requirement in the tomographic image D1, as the localization region A. Alternatively, in the step S3, the region extraction unit 42 may extract the localization region A by using a trained model. FIG. 13 is a flowchart showing a flow of an evaluation process in a case in which a trained model is used.

In the example of FIG. 13, first, the computer 30 creates a trained model by deep learning (step S0, training step). The trained model is an input/output device configured to receive the tomographic image D1 of the spheroid 9 as input information and produce the localization region A corresponding to the localization region 9*a* in the tomographic image D1 as output information. The computer 30 creates the trained model in accordance with a supervised machine learning algorithm by using a number of the tomographic images D1 prepared in advance and the localization regions A included in the tomographic images D1, as training data. The trained model is stored in the storage unit 33. For the machine learning algorithm, semantic segmentation can be used, for example, but the machine learning algorithm is not limited thereto.

Meanwhile, many spheroids 9 are formed (step S1, spheroid formation step). The spheroid formation step of the step S1 may be performed after the training step of the step S0 as shown in FIG. 13, or may be performed before the training step or in parallel with the training step.

After the training step of the step S0 and the spheroid formation step of the step S1 are performed, the observation apparatus 1 take an image of the spheroid 9 (step S2, image acquisition step). Subsequently, the region extraction unit 42 of the computer 30 extracts the localization region A corresponding to the localization region 9*a* from the tomographic image D1 acquired by imaging (step S3, region extraction step). Specifically, the region extraction unit 42 inputs the tomographic image D1 acquired in the step S2 to the trained model created in the step S0. As a result of this, the localization region A is output from the trained model. Thus, it is possible to extract the localization region A without performing processes such as the steps S31 to S33 described above.

4-2. Second Modification

The above-described preferred embodiment has discussed a case in which the localization region A is extracted from the tomographic image D1. Alternatively, the localization region A may be extracted from the three-dimensional image D2. In a case in which the three-dimensional image D2 is used for region extraction, a three-dimensional region corresponding to the localization region 9*a* is extracted from three-dimensional coordinates forming the three-dimensional image D2, as the localization region A, in the step S3 described above. Then, the ratio of the localization region 9*a* is calculated from the volume of the extracted three-dimensional region corresponding to the localization region 9*a* and the volume of the entire spheroid 9, and the evaluation parameter V is calculated on the basis of the ratio. The extraction method in this case may be region extraction based on an intensity value, like that in the above-described preferred embodiment, or may be region extraction using a trained model, like that in the above-described first modification.

4-3. Other Modifications

According to the above-described preferred embodiment, the sample holder 90 is a well plate including the plurality of wells (recessed portions) 91, and each of the wells 91 holds one biological sample 9. Alternatively, one well may hold a plurality of biological samples. In such a case, one image may include regions respectively corresponding to the plurality of biological samples. Further alternatively, the sample holder that holds a biological sample may be a dish having only one recessed portion.

Moreover, the respective elements described in the above-described preferred embodiment and modifications may be appropriately combined unless contradiction occurs.

While the invention has been shown and described in detail, the foregoing description is in all aspects illustrative and not restrictive. It is therefore understood that numerous modifications and variations can be devised without departing from the scope of the invention.

What is claimed is:

1. An evaluation method for a spheroid used in a bio 3D printer, comprising:

an image acquisition step of imaging the spheroid by optical coherence tomography and acquiring a photographic image;

a region extraction step of extracting a localization region in which one kind of cell is localized, from the photographic image;

an analysis step of analyzing the localization region; and an evaluation step of evaluating a condition of the spheroid, wherein the spheroid is a spheroid including multiple kinds of liver-derived cells including a hepatocyte, and the analysis step includes:

a first calculation step of calculating an area of the entire spheroid in the photographic image;

a second calculation step of calculating an area of the localization region in the photographic image;

a third calculation step of calculating a ratio of the localization region on the basis of the area of the entire spheroid and the area of the localization region; and a fourth calculation step of calculating an evaluation parameter on the basis of the ratio of the localization region, wherein the evaluation parameter is an estimated value of enzyme activity of CYP3A4 in the spheroid.

2. The evaluation method according to claim 1, wherein the evaluation step includes a determination step of determining a quality of the spheroid on the basis of the evaluation parameter.

3. The evaluation method according to claim 1, wherein the evaluation parameter is an estimated value of a secretion amount of predetermined protein in the spheroid.

4. The evaluation method according to claim 1, wherein the region extraction step includes:

a first extraction step of extracting an entire region corresponding to the spheroid, from the photographic image;

a second extraction step of extracting a high-intensity region of which intensity value is higher than a predetermined threshold value in the entire region; and a third extraction step of extracting a region that is left after the high-intensity region and a region inner than the high-intensity region are excluded from the entire region, as the localization region.

5. An evaluation method for a spheroid used in a bio 3D printer, comprising:

a training step of creating a trained model configured to receive a photographic image of the spheroid imaged by optical coherence tomography, as input information, and produce a localization region in which one kind of cell is localized, as output information, by deep learning;

an image acquisition step of imaging the spheroid by optical coherence tomography and acquiring a photographic image;

a region extraction step of inputting the photographic image to the trained model, to extract the localization region output from the trained model;

an analysis step of analyzing the localization region; and an evaluation step of evaluating a condition of the spheroid, wherein the spheroid is a spheroid including multiple kinds of liver-derived cells including a hepatocyte, and the analysis step includes:

a first calculation step of calculating an area of the entire spheroid in the photographic image;

a second calculation step of calculating an area of the localization region in the photographic image;

a third calculation step of calculating a ratio of the localization region on the basis of the area of the entire spheroid and the area of the localization region; and a fourth calculation step of calculating an evaluation parameter on the basis of the ratio of the localization region, wherein the evaluation parameter is an estimated value of enzyme activity of CYP3A4 in the spheroid.

* * * * *